United States Patent [19]

Chernotsky et al.

[11] Patent Number: 4,488,106
[45] Date of Patent: Dec. 11, 1984

[54] RESETTABLE POWER LIMITING APPARATUS

[76] Inventors: Alan Chernotsky, 36 Lakeshore Dr., Rockaway, N.J. 07866; Richard Satz, 20 Cedar La., Succasunna, N.J. 07876

[21] Appl. No.: 394,480
[22] Filed: Jul. 1, 1982
[51] Int. Cl.$^3$ .......................................... H02J 13/00
[52] U.S. Cl. ................................. 323/239; 323/323; 323/241; 323/300; 307/35; 307/39; 307/48
[58] Field of Search ............... 323/229, 231, 239, 241, 323/282–283, 300, 320–325; 307/35, 39, 48, 62, 66, 71; 236/46 R, 46 A, 46 B, 46 C

[56] References Cited

U.S. PATENT DOCUMENTS

| 3,296,452 | 1/1967 | Williams | 307/62 |
| 3,659,114 | 4/1972 | Polenz et al. | 307/52 |
| 4,213,058 | 7/1980 | Townsend | 307/39 X |
| 4,216,384 | 8/1980 | Hurley | 307/39 |

Primary Examiner—Peter S. Wong
Attorney, Agent, or Firm—Lerner, David, Littenberg, Krumholz & Mentlik

[57] ABSTRACT

This apparatus can limit the power by limiting the duty cycle of current carried by a pair of lines. These lines intermittently conduct electrical power. A clock can provide a periodic timing signal. This clock is resettable to change the phasing of the timing signal. A switch serially coupled to at least one of the lines can periodically interrupt current of the lines with a period proportional to the period of the periodic timing signal. A resetter coupled to at least one of the lines can reset the clock in response to the average magnitude of voltage across the lines increasing by a predetermined extent.

16 Claims, 2 Drawing Figures

RESETTABLE POWER LIMITING APPARATUS

BACKGROUND OF THE INVENTION

The present invention relates to power limiting apparatus and, in particular, to equipment for establishing a duty cycle scaled to correspond with the measurement cycle of a peak demand meter.

It is known to reduce the duty cycle of power supplied to an air conditioning system to reduce the peak demand required from utility lines. However, these systems have not considered the advantage of scaling the repetition rate of the switching to complement a peak demand meter. Such a peak demand meter measures over successive intervals of a predetermined duration the highest amount of energy consumed during the intervals. The highest energy demanded during these intervals is used by the utility to set the billing rate to the consumer. Unfortunately, a consumer who uses very little energy overall but occasionally requires a high peak power input may be billed at a substantially higher rate than heavier users.

Known demand limiting systems generally require a continual potential across the affected lines for proper operation. Therefore, these known systems cannot be connected into a pair of lines that run to the thermostatic switch of an air conditioning system. When the thermostatic switch is closed, there is no potential across the associated lines and, therefore, no potential is present for driving this demand limiting system.

Another consideration is switching of load more rapidly than they can tolerate. For example, once an air conditioning compressor is turned off, it must remain off for a minimum time interval to allow release of fluids trapped therein. Premature operation can cause extreme stress and damage.

Accordingly, there is a need for a simple and effective system which limits the peak power demands measured by a given demand meter and which can be connected to various points in the load circuit.

SUMMARY OF THE INVENTION

In accordance with the illustrative embodiments demonstrating features and advantages of the present invention, there is provided apparatus for limiting power by limiting the duty cycle of current carried by a pair of lines. These lines intermittently conduct electrical power. The apparatus includes a clock means for providing a periodic timing signal. This clock means is resettable to change the phasing of the timing signal. A switch means serially coupled to at least one of the lines can periodically interrupt current of the lines with a period proportional to the period of the periodic timing signal. A reset means is coupled to at least one of the lines for resetting the clock means in response to the average magnitude of voltage across the lines increasing by a predetermined extent.

According to one embodiment of the present invention, the power demand through a pair of lines as measured by a peak demand meter is reduced. This peak demand meter can record the highest amount of average power consumed during successive time intervals, each interval having a predetermined duration. Preferably, a clock provides a periodic timing signal to control a cycling switch. The cycling switch is serially connected with power lines to periodically interrupt current from the power lines with a period proportional to the period of the periodic timing signal. The period of the switch means is about as long as the predetermined duration of the peak demand meter.

By employing apparatus and methods of the foregoing type, the peak demand logged against a consumer can be reduced drastically. In one embodiment where a peak demand meter measures average power consumed over a fifteen minute interval, a switch interrupts the power to a load every fifteen minutes to produce a 50% duty cycle. The peak power demand in this embodiment was therefore reduced by 50%, if the load would have been powered throughout the fifteen minute intervals.

In the situation where the load is an air conditioning unit, it has been found that periodic interruption does not necessarily reduce the comfort provided by the air conditioner. This is because usually an air conditioning unit remains on for a relatively long interval followed by a relatively long off interval. Essentially, the preferred embodiment of the invention redistributes the relatively long off and on intervals into a series of short on (e.g. 7½ minute) intervals followed by a short off interval. Of course, the specific duration can be lengthened or shortened depending upon the application. Consequently, the overall cooling effect remains the same except that now the air conditioning unit works on a more rapidly repeating duty cycle. As a result of the foregoing, the consumer pays for power demanded at a greatly reduced rate.

In a preferred embodiment the clock timing the cycling of power to an air conditioning or other unit, is sensitive to start-up considerations. For example, power restoration must be carefully regulated if power is interrupted by external causes such as power failure, operator intervention, etc. The clock of the preferred embodiment senses restoration of power and resets to a phase in which power is kept off for one half of the clock timing cycle. This feature avoids restoration of power after an unacceptably short interruption. This feature is especially significant for air conditioning compressors which need time to purge their cylinders before restarting. Premature restarting can overstress these compressors. The preferred embodiment employs a detector coupled to the power lines to sense an increase in the peak magnitude of line voltage. In one form the detector uses a diode charging a capacitor to the present line voltage peak. A magnitude increase applied to this type of circuit can transfer resetting pulses to the clock.

A significant advantage of the present invention is that it can operate on virtually any of the lines controlling or powering the load. Consider a pair of lines to a thermostatic switch which when the switch is closed has zero potential across them. In a preferred embodiment, an energy storage system is charged when the thermostatic switch is open so that an energizing potential can be produced even when the thermostatic switch subsequently closes. It is also preferable to include a series element such as a zener diode in one of the lines so that a usable voltage exists even if the thermostatic switch is closed. Although there is practically no voltage drop across the closed switch, the current flowing therethrough can be used to drive the zener to a stable voltage that can be used to charge the energy storage system. Thus the energy storage system (which can be a capacitor or a battery) is charged continuously whether the thermostatic switch is open or closed, so long as the utility lines are still in a condition to deliver power.

In one embodiment, a pulse generator drives a divider to cycle a triac on and off every fifteen minutes. This triac is in the thermostatic circuit of an air conditioning system. In other embodiments, however, the triac can either control the current directly delivered to a load or current delivered to a relay controlling the load current. Alternatively, the triac controls a larger triac which in turn drives a coil operating a high current contactor.

BRIEF DESCRIPTION OF THE DRAWINGS

The above brief description as well as other objects, features and advantages of the present invention will be more fully appreciated by reference to the following detailed description of the presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
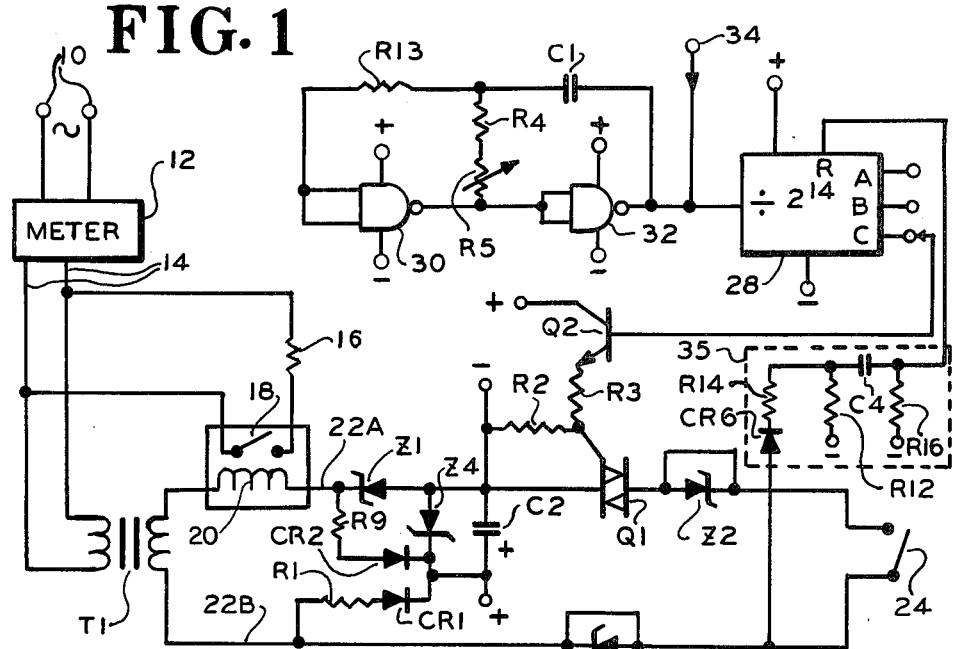
FIG. 1 is a schematic diagram of apparatus according to the principles of the present invention.

Referring to FIG. 1, the illustrated apparatus can limit power delivered from power lines 10 through peak demand meter 12. Peak demand meter 12, in this embodiment, measures the amount of average power drawn from utility lines 10 during successive time intervals of a predetermined duration. Peak demand meter 12 records the highest amount of power consumed during those successive time intervals (e.g. each ¼ hour). The largest measurement thus made is defined by the utility as the peak demand of the consumer from utility lines 10. This peak demand together with the billing rate establishes the cost for demand wattage. Therefore, the higher the peak demand, thus recorded, the higher the cost. Pair of lines 14 from meter 12 connect to the primary of transformer T1 and the series combination of load 16 and relay contacts 18 as well. Load 16, in this embodiment, is an air conditioning unit, however, it will be appreciated that the load may be any device consuming electrical energy. The secondary of transformer T1 is serially connected with another load, in this embodiment, relay coil 20 which operates contacts 18. The serial combination of the secondary of transformer T1 and relay coil 20 connects across a pair of lines identified herein as lines 22A and 22B. A zener diode Z1, acting as a series means has its cathode connected to line 22A and its anode to the main electrode of a switching means, shown herein as bidirectional current conducting device Q1. Its other main electrode connects to one thermostatic switch 24, whose other terminal connects to line 22B. Thus connected, device Q1 (a triac) can complete the circuit from the secondary of transformer T1 through zener Z1 and thermostatic switch 24 to the relay coil 20. It will be appreciated, however, that for some embodiments relay coil 20 (or switch 24) may be eliminated and switch 24 (or coil 20) is replaced with a load circuit. This load circuit could be any energy consuming device which is operable at a reduced duty cycle. Alternatively, the position of relay coil 20 can be transposed with thermostatic switch 24 to produce a functionally equivalent circuit. Also, the position of zener Z1 can be changed as further explained hereinafter. This change is suggested by zener diodes Z2 and Z3. Zener Z2 is serially connected between triac Q1 and switch 24 (cathode to switch 24) while zener Z3 is serially connected between switch 24 and line 22B (anode to switch 24). Of course zeners Z2 and Z3 are shown shorted since these alternate positions are not used herein.

An energy storage means is shown herein as electrolytic capacitor C2, although a charge storage device such as a nickel-cadmium battery can be used instead. The negative terminal of capacitor C2, identified by a terminal bearing a negative symbol, connects to similarly identified terminals in this schematic as well as to the anode of zener diode Z1. The positive terminal of capacitor C2, identified as a supply terminal bearing a positive symbol, connects to similarly identified terminals in this schematic.

A voltage tapping means is shown herein as a unidirectional conducting device CR1 serially connected to resistor R1. Resistor R1 is connected between line 22B and the anode of diode CR1, its cathode being connected to the positive terminal of capacitor C2. Another voltage tapping means has a resistor R9 connected between line 22A and the anode of diode CR2, whose cathode connects to the positive terminal. A voltage regulating zener diode Z4 has its cathode connected to the positive terminal and its anode connected to the anode of zener diode Z1.

Resistor R2 is connected between the anode of zener diode Z1 and the gate electrode of triac Q1. Resistor R3 connects between this gate electrode and the emitter of NPN transistor Q2, whose collector is connected to the previously mentioned positive terminal and whose base is connected to a clock means. This clock means includes a divider 28, having a plurality of output terminals A, B and C. Those output terminals are part of a selection means whereby the base of transistor Q2 can be connected to any of the output terminals. In this embodiment, divider 28 can divide incoming pulses by a maximum factor of $2^{14}$(16,384). Terminal C, to which the base of transistor Q2 is presently connected, provides this maximum division. Accordingly an 18.2 Hertz oscillator input applied to input terminal 34 provides an output cycle of 900 seconds.

A reset means is shown herein as a detector 35 having a unidirectional conducting device CR6, whose anode connects to line 22B. A capacitive element C4 has one terminal connected to the resetting input R of divider R and the other terminal connected to a resistive element R12 which leads to the negative terminal. Resistor R14 connects between the cathode of diode CR6 and the junction of resistor R12 and capacitor C4. Resistive element R16 connects between resetting input R and the negative terminal.

A pulse generator is shown herein as a pair of logic gates, NAND gates 30 and 32. The output of NAND gate 30 connects to both inputs of NAND gate 32, whose output connects to one terminal of capacitor C1. Its other terminal connects to one terminal of resistor R13, whose other terminal connects to both inputs of NAND gate 30. The series combination of resistor R4 and variable resistor R5 connects between the output of NAND gate 30 and the junction of resistor R13 and capacitor C1. The output of NAND gate 32 is identified as an input test terminal 34. NAND gate 30 and 32 as well as divider 28, receive power from capacitor C2 as indicated by the positive and negative terminals leading to them. Terminal 34 is the input of divider 28.

Figure 2:
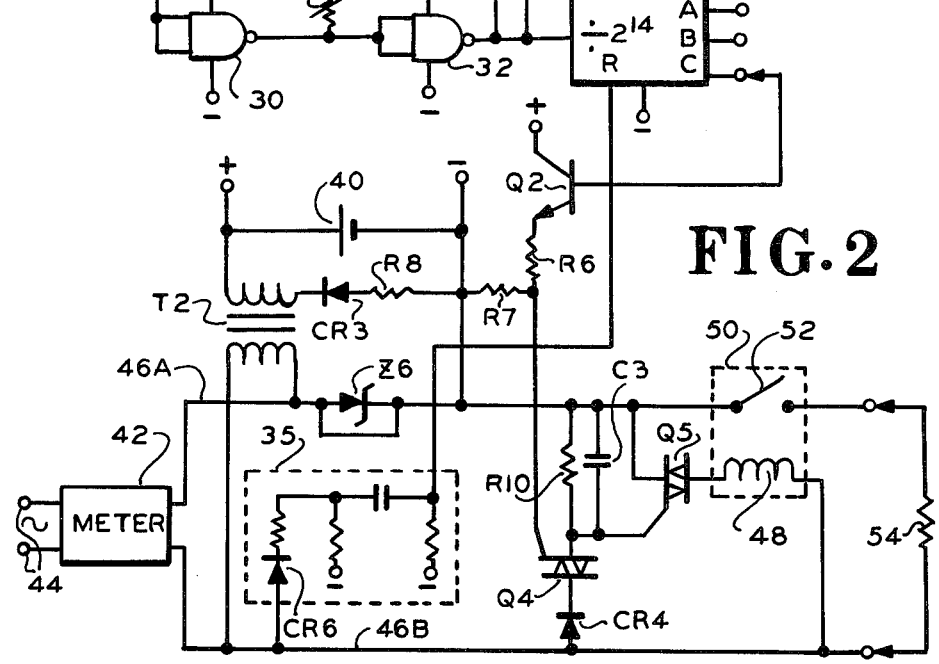
FIG. 2 is a schematic diagram of an embodiment which is an alternate to that of FIG. 1.

Referring to FIG. 2, identically labeled elements are the same components connected in the same manner as previously described. Again, output C of divider 28 connects to the base of transistor Q2 to drive that transistor. Serially connected between the negative terminal and the emitter of transistor Q2 is the series combination of resistors R7 and R6. This negative terminal is a negative battery terminal for nickel-cadmium battery 40, whose positive terminal connects to one lead of the secondary of transformer T2, its other lead connecting to the cathode of diode CR3. Resistor R8 connects between the negative terminal of battery 40 and the anode of diode CR3. Connected in parallel with the primary of transformer T2 are the output lines, lines 46A and 46B, of peak demand meter 42, whose input lines connect to utility lines 44. Line 46A connects to the negative terminal of battery 40 and to one terminal of resistor R10, whose other terminal connects to one main terminal of switching device Q4, its other main terminal connecting to the cathode of diode CR4. Capacitor C3 is connected in parallel with resistor R10. The anode of diode CR4 connects to line 46B. The gate of switching device Q4 (in this embodiment, a triac) connects to the junction of resistors R6 and R7. A semiconductor switch, shown herein as triac Q5, has its trigger electrode connected to the junction of triac Q4 and resistor R10. Line 46A connects to one switching electrode of triac Q5, its other switching electrode connecting to one terminal of relay coil 48, whose other terminal connects to line 46B. Coil 48 is part of relay 50 and drives relay contacts 52 which connect between line 46A and one terminal of load 54, whose other terminal connects to line 46B.

The previously illustrated reset means 35 is shown connected as before to resetting terminal R of divider 28 while the anode of diode CR6 is shown connected to line 46B. A selectable series means is shown herein as shorted zener diode Z6 serially connected in line 46A between meter 42 and contacts 52. This zener could provide a voltage when line 46A is conducting should the voltage drop across load 54 be insufficient or if load 54 were replaced with a switch.

To facilitate an understanding of the principles associated with the foregoing apparatus, its operation will be briefly described. Referring first to FIG. 1, it will be presumed that thermostatic switch 24 opens (and closes) regularly. Initially assuming triac Q1 is non-conductive, the open secondary voltage of transformer T1 appears across lines 22A and 22B. Accordingly, diodes CR1 and CR2 act as a full wave rectifier producing pulses that charge capacitor C2. Were triac Q1 conducting with switch 24 closed, a regulated unipolar, pulsating voltage drop would appear across zener diode Z1 and therefore effectively across lines 22A and 22B. Therefore diode CR2 would act as a half-wave rectifier again charging capacitor C2. Therefore capacitor C2 is charged regardless of the state of switches 24 and Q1 provided transformer T1 is powered.

Also for some embodiments, elements R9 and CR2 may be removed, zener diode Z1 shorted and zener diode Z2 or Z3 unshorted. This simplified circuit causes half wave charging through diode CR1 whether lines 22A and 22B are conducting or not. Consequently, the positive and negative terminals have across them a predetermined potential. Due to the blocking action of diode CR1, this potential persists even though the potential across lines 22A and 22B may briefly fall to zero.

Therefore, an energizing potential is applied to the clock comprising divider 28 and NAND gates 30 and 32. Since positive feedback is provided by resistor R13 and capacitor C1, NAND gates 30 and 32 oscillate. The frequency of this oscillation can be adjusted by variable resistor R5 in a conventional fashion. This adjustment is set to produce a pulse train at terminal 34 having a repetition rate of 18.2 Hertz. This 18.2 Hertz signal is divided by binary divider 28 by the factor $2^{14}$. Consequently, the output produced on terminal C has a period of approximately fifteen minutes, 7.5 minutes on and 7.5 minutes off. It will be appreciated, of course, that this period can be altered and its duty cycle varied depending upon the specific application. The selected output terminal of divider 28 can be changed to reduce that period of fifteen minutes by one half or one quarter, or any division of 2, as desired.

Selected output C of divider 28 renders transistor Q2 alternatively conductive and nonconductive from its collector to its emitter. Consequently, the voltage between the gate electrode of triac Q1 and line 22A alternates from positive to zero potential, rendering triac Q1 alternately conductive and nonconductive, respectively.

It is now assumed that thermostatic switch 24 closes. Therefore, triac Q1 is able to conduct through actuated switch 24 at a period and duty cycle determined by divider 28. Therefore, current flows through relay coil 20 at a 50% duty cycle, cycling every fifteen minutes. As a result, air conditioning load 16 operates for $7\frac{1}{2}$ minutes and is then disabled for $7\frac{1}{2}$ minutes. It is recommended that for air conditioning loads the off period be reasonably long so the compressors can discharge refrigerant that may be temporarily trapped in the compression chamber of the compressor. An attempt to operate the compressor before the refrigerant has discharged will cause an excessive load on the compressor piston which can fatique or break it.

As a result of the foregoing, current is supplied to air conditioning load 16 from peak demand meter 12 for only one half of its time measurement interval of fifteen minutes. Therefore, the peak load measured by meter 12 is half of what would have been measured in the absence of the apparatus of FIG. 1.

When switches Q1 and 24 are closed, the essentially zero voltage across them is also applied across diode CR6 and resistors R14 and R12. Accordingly, the terminal of capacitor C4 connected to resistor R12 is at the same potential as the negative terminal. Capcitor C4 is sized so that within a minute or so it discharges through resistors R12 and R16 to zero volts. When switch 24 (or triac Q1 for that matter) opens, a pulsating positive voltage is coupled through diode CR6 and capacitor C4 to resetting input R until capacitor C4 charges to the positive peak of line 22B. Consequently divider 28 is reset to an off cycle, thereby opening triac Q1 for 7.5 minutes. This ensures that power removed from coil 20 cannot be restored immediately. This prevents unacceptably rapid power restoration that may damage air conditioning compressors. Alternatively, the utility lines may fail and cause a power interruption eventually resulting in a discharge of capacitor C4. Consequently, restoration of power again causes coupling of a pulsating positive voltage through diode CR6 and capacitor C4 to resetting input R until capacitor C4 charges to the positive peak of line 22B. Again divider 28 is reset to an off state for 7.5 minutes to prevent premature restoration of power.

It will be appreciated that resetting of divider 28 can be through its reset or set input and accordingly signals may require inversion to account for such a reconnection.

The operation of the apparatus of FIG. 2 is similar, divider 28 producing pulses which alternately render transistor Q2 conductive and nonconductive. In this embodiment, transformer T2 is provided primarily to maintain the charge on battery 40 through resistor R8 and diode CR3.

Since transistor Q2 is alternately conductive and nonconductive, it alternates the gate of triac Q4 between a positive or zero potential with respect to its main electrode connected to resistor R10. Consequently, triac Q4 conducts at a 50% duty cycle over a period of fifteen minutes. This produces a pulsating positive voltage across resistor R10 which renders triac Q5 conductive at a 50% duty cycle having a period of fifteen minutes. As a result, a circuit is periodically made through triac Q5 from the output terminals of meter 42 through relay coil 48. Consequently, relay contacts 52 cycle every fifteen minutes at a 50% duty cycle. Therefore, load 54 is also energized at a 50% duty cycle with a fifteen minute period. Therefore, as before, peak demand meter 42 reads a peak demand which is only half of what would be read in the absence of the apparatus of FIG. 2.

Again, reset means 35 place divider 28 at the beginning of an off cycle if power is interrupted due to a failure of utility lines 44. Furthermore, the opening of switch 52 also produces a sudden increase in the peak magnitude of voltage across lines 46A and 46B which again resets divider 28 to the beginning of an off cycle, ensuring that power is not rapidly reapplied to load 54. The latter increase in voltage across lines 46 is due to the usual increase in line voltage under no load conditions. Of course, if this no load fluctuation is unusably small, a small inductor can be inserted in either line 46A or 46B immediately after meter 42.

Finally in the event load 54 is replaced with a switch, zener diode Z6 can be unshorted to provide power to charge battery 40, in a manner similar to zener Z1 of FIG. 1.

It is to be appreciated that various modifications may be implemented with respect to the above described preferred embodiments. For example, in systems requiring or allowing the switching of direct current voltages, thyristors or other types of switching devices may be substituted for the illustrated triacs. Furthermore, various types of loads can be switched and for loads that need not remain off for a minimum period of time, the repetition rate may be substantially increased. In addition, some embodiments may use a duty cycle differing from 50%. For thermostatically controlled embodiments, the apparatus can be inserted into the lines leading to either: the thermostat, the utility lines or the relay coil operated by the thermostat. In other embodiments, the apparatus may be inserted in a line running directly from the utility lines to the load. While a nickel-cadmium battery is illustrated, other batteries may be employed in different embodiments. Also instead of integrated circuitry, discrete circuits may be used. Moreover, various components may be substituted for the illustrated components depending upon the desired power, speed, stability, size, permissible heating, accuracy, etc. It is also anticipated that to avoid the effect of humidity or corrosive effects, the circuit may be mounted on a printed circuit board and completely encapsulated in polyurethane.

It is also noted that for test purposes, a high frequency signal may be injected into the input of the divider to cause it to cycle much more rapidly then designed, thereby reducing the test time.

Obviously, many modifications and variations of the present invention are possible in light of the above teachings. It is therefore to be understood that within the scope of the appended claims, the invention may be practiced otherwise than as than specifically described.

What is claimed:

1. Apparatus for limiting power by limiting the duty cycle of current carried by a pair of lines, said lines intermittently conducting electrical power, comprising:
   a clock means for providing a periodic timing signal, said clock means being resettable to change the phasing of said timing signal;
   a switch means serially coupled to at least one of said lines to periodically interrupt current of said lines with a period proportional to the period of said periodic timing signal; and
   reset means coupled to at least one of said lines for resetting said clock means in response to the average magnitude of voltage across said lines increasing by a predetermined extent.

2. Apparatus according to claim 1 wherein resetting of said clock means phases the timing signal to cause said switch means to interrupt current of said lines.

3. Apparatus according to claim 2 wherein said timing signal is divisible into an on interval and an off interval, resetting of said clock means bringing said timing signal to the beginning of said off interval.

4. Apparatus according to claim 3 wherein said reset means comprises:
   a detector for sensing the peak voltage excursions on said line and for producing a reset signal in response to an increase in said excursions.

5. Apparatus according to claim 3 wherein said reset means includes:
   a capacitive element; and
   a unidirectional conducting device serially connected with said capacitive element between said clock means and a first one of said lines.

6. Apparatus according to claim 5 wherein said reset means further comprises:
   a resistive element connected between one terminal of said capacitive element and a second one of said lines.

7. Apparatus according to claim 1 further comprising:
   energy storage means driven by said lines for converting its intermittent electrical signals to uninterrupted electrical power and supplying said uninterrupted power to said clock means.

8. Apparatus according to claim 7 wherein said lines are coupled to utility lines through a peak demand meter, said meter being operable to record the highest amount of average power consumed during successive time intervals, each having a predetermined duration, said clock means having a period about as long as said predetermined duration, said switch means being actuated once during said period.

9. Apparatus according to claim 8 wherein the duty cycle of said switch means is about 50% and wherein said storage means comprises a capacitor.

10. Apparatus according to claim 9 wherein said lines carry alternating current and wherein said switch means comprises a bidirectional current conducting device having a gate electrode and a pair of main electrodes, said gate electrode being coupled to said clock means.

11. Apparatus according to claim 1 wherein said clock means comprises:
   a pulse generator; and
   a divider driven by said generator for producing a square wave signal at a frequency proportional to and lower than the repetition rate of said pulse generator, said divider being resettable to an initial count by said reset means.

12. Apparatus according to claim 11 wherein said divider has a plurality of output terminals each producing a signal having a different frequency, said switch means having:
   selection means for connecting said switch means to any one of said plurality of output terminals whereby the period of said switch means is rendered adjustable.

13. Apparatus according to claim 12 wherein said pulse generator comprises:
   a pair of logic gates connected to produce positive feedback.

14. Apparatus according to claim 1 further comprising:
   a supply terminal for receiving electrical power from said pair of lines, said lines having a variable current and voltage;
   a voltage tapping means coupled to said lines and to said terminal for applying to the latter power drawn from said lines when their voltage difference exceeds a predetermined value, said voltage tapping means taking the form of a unidirectional conducting device coupled between said supply terminal and one of said lines; and
   a series means serially coupled into a given one of said lines for producing a voltage drop, said series means being coupled to said supply terminal for supplying power thereto as a predetermined function of the voltage drop of said series means.

15. Apparatus according to claim 1 further comprising:
   a supply terminal for receiving electrical power from said pair of lines, said lines having a variable current and voltage;
   a voltage tapping means coupled to said lines and to said terminal for applying to the latter power drawn from said lines when their voltage difference exceeds a predetermined value, said voltage tapping means including a charge storage device coupled between one of said lines and said supply terminal; and
   a series means serially coupled into a given one of said lines for producing a voltage drop, said series means being coupled to said supply terminal for supplying power thereto as a predetermined function of the voltge drop of said series means, said series means taking the form of a zener diode.

16. Apparatus according to claim 1 further comprising:
   a supply terminal for receiving electrical power from said pair of lines, said lines having a variable current and voltage;
   a voltage tapping means coupled to said lines and to said terminal for applying to the latter power drawn from said lines when their voltage difference exceeds a predetermined value; and
   a series means serially coupled into a given one of said lines for producing a voltage drop, said series means being coupled to said supply terminal for supplying power thereto as a predetermined function of the voltage drop of said series means wherein said lines having connected between adjacent ends thereof a switch, closing of said switch reducing the voltage difference between said lines below said predetermined value, whereby said series means and not said voltage tapping means is operable to supply power to said supply terminal.

* * * * *

UNITED STATES PATENT AND TRADEMARK OFFICE
CERTIFICATE OF CORRECTION

PATENT NO. : 4,488,106
DATED : December 11, 1984
INVENTOR(S) : Alan Chernotsky and Richard Satz It is certified that error appears in the above-identified patent and that said Letters Patent are hereby corrected as shown below:

Column 3, line 55, after "one" insert --terminal of--.

Signed and Sealed this

Thirtieth Day of April 1985

[SEAL]

Attest:

DONALD J. QUIGG

Attesting Officer

Acting Commissioner of Patents and Trademarks